United States Patent [19]

Christy et al.

[11] 4,147,307

[45] Apr. 3, 1979

[54] MULTIPLE EMITTER FLOW CONTROL

[76] Inventors: Mark H. Christy, 1534 E. Edinger, Santa Ana, Calif. 92705; Lloyd Spencer, 220 Patrician Way, Pasadena, Calif. 91105

[21] Appl. No.: 783,291

[22] Filed: Mar. 31, 1977

Related U.S. Application Data

[63] Continuation-in-part of Ser. No. 728,998, Oct. 4, 1976, abandoned.

[51] Int. Cl.² .............................................. B05B 15/02
[52] U.S. Cl. ...................................... 239/542; 138/45; 239/547
[58] Field of Search ................................ 239/107–109, 239/145, 271, 542, 547; 61/12, 13; 138/45, 46

[56] References Cited

U.S. PATENT DOCUMENTS

| Re. 29,022 | 11/1976 | Spencer | 239/542 |
|---|---|---|---|
| 3,779,468 | 12/1973 | Spencer | 239/542 |
| 3,918,646 | 11/1975 | Leal-Diaz et al. | 239/542 X |
| 4,037,791 | 7/1977 | Mullett et al. | 239/542 |

Primary Examiner—Johnny D. Cherry

[57] ABSTRACT

A multiple emitter flow control which utilizes an irrigation flow tube provided with a series of outlets which receive a series of flexible emitters, the walls of each emitter being biased to form a flush flow passage extending radially inward from its corresponding outlet, the flush flow passage being collapsible, when the walls are subject to a bending force, causing the emitter to deflect angularly from its outlet, and also collapsible, when subject to water pressure above a preselected value, each emitter when collapsed by a bending force or by water pressure forming a drip flow passage from the interior of the irrigation tube through its outlet; the walls of the irrigation flow tube between irrigation cycles being biased to a normally flattened profile. An embodiment of the emitter being of greater length than the minor dimension of the flattened irrigation flow tube. Another embodiment utilizes an irrigation flow tube which is initially a web permitting attachment of the emitters to the inner surface of the irrigation flow tube whereupon the web is folded into a tube and longitudinally sealed. A further embodiment of the emitter tube has a short length approximating the minor dimension of the flattened irrigation flow tube.

15 Claims, 18 Drawing Figures

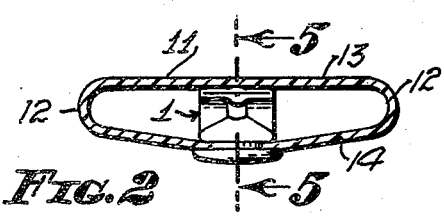
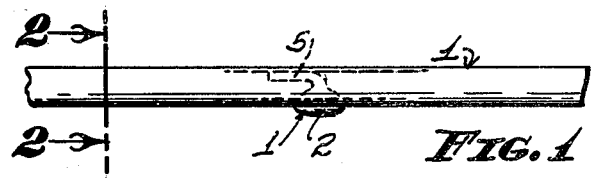
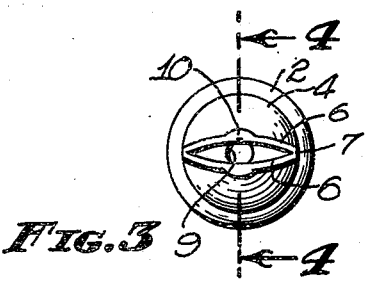
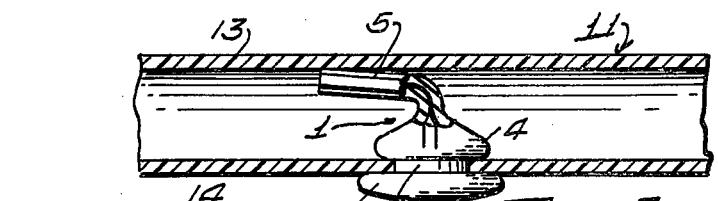
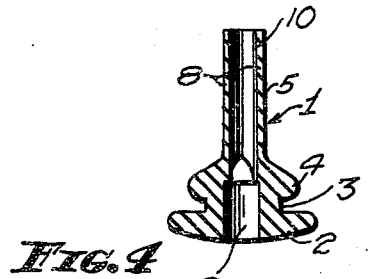
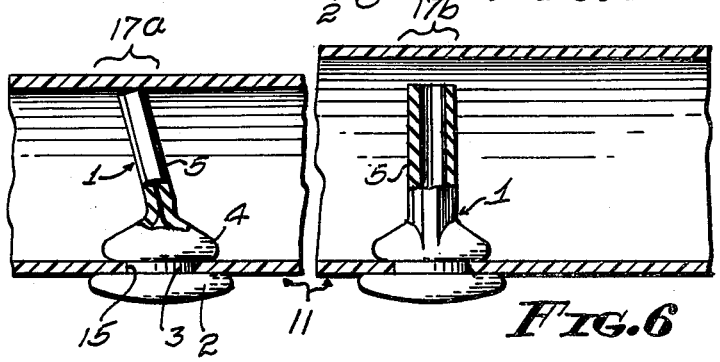
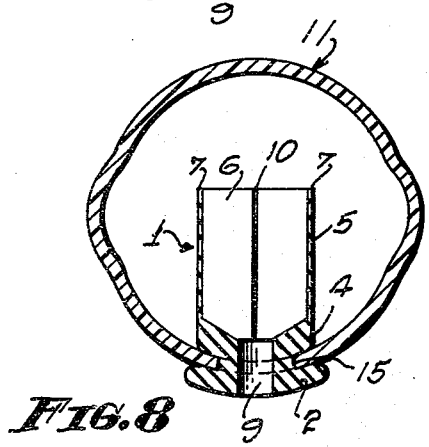
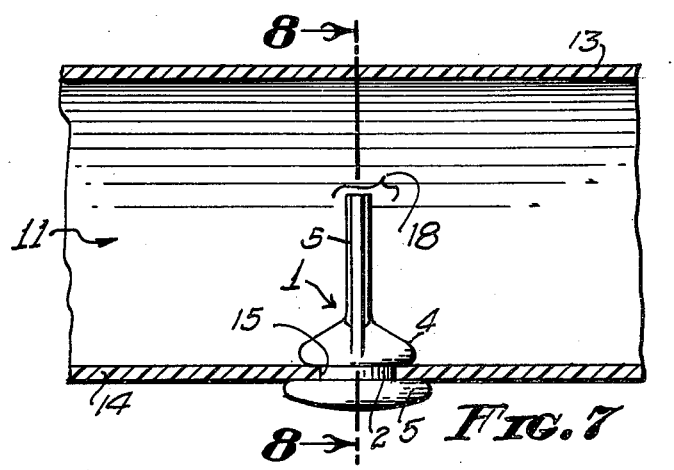
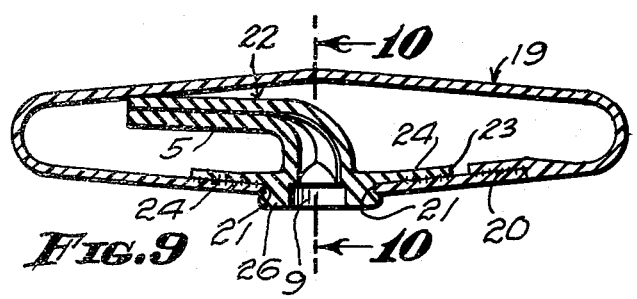
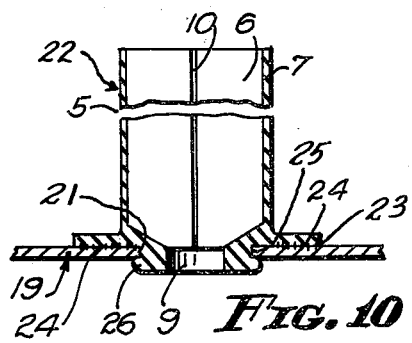

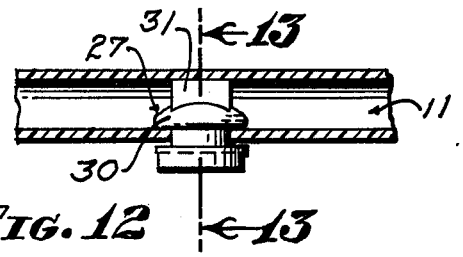
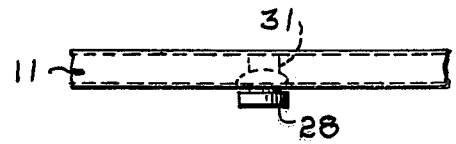
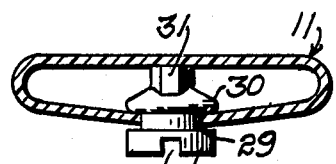
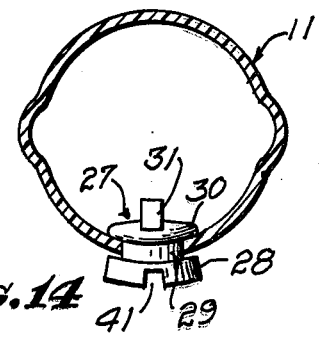
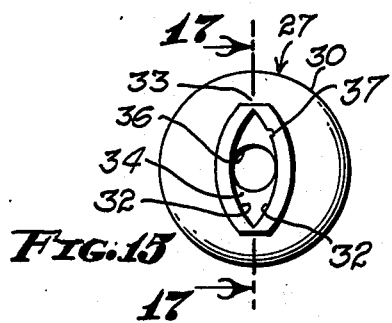
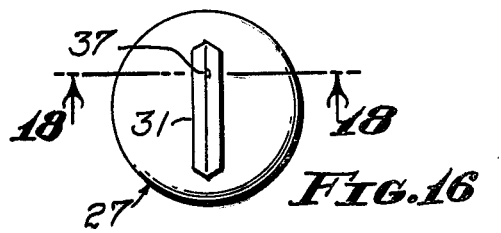
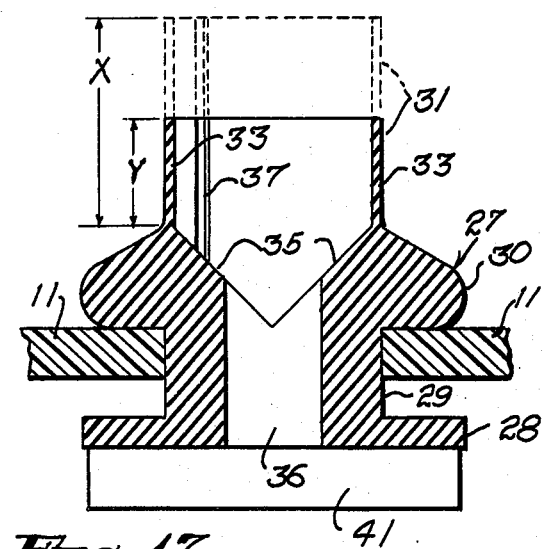
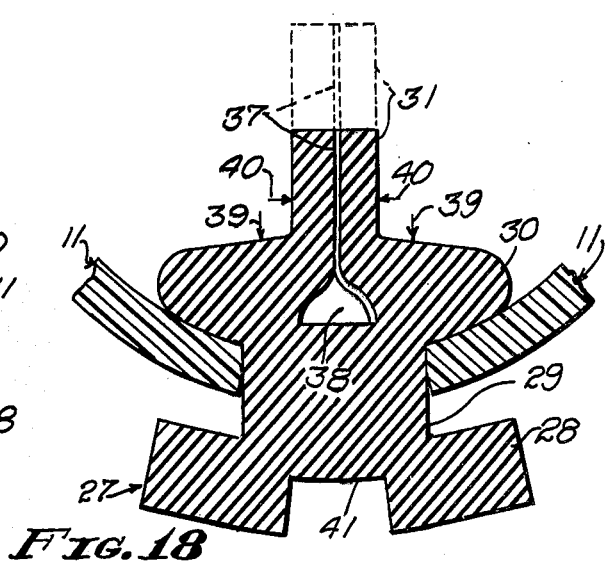

MULTIPLE EMITTER FLOW CONTROL

The present application is a continuation-in-part of a copending application Ser. No. 728,998, filed Oct. 4, 1976, now abandoned, entitled EMMITTER FLOW CONTROL TUBE.

BACKGROUND

This invention is directed to drip or trickle flow irrigation systems utilizing emitters of the flush-drip type such as disclosed in U.S. Pat. No. Re. 29,022 and in copending application Ser. No. 708,062, now U.S. Pat. No. 4,113,180.

A problem in the development of drip or trickle irrigation systems, especially for row crops is to produce an inexpensive emitter of the type which undergoes flush flow as well as being capable of essentially constant drip flow over a wide pressure range, and in addition is capable of insertion at low cost in an irrigation flow tube.

Another problem encountered in drip or trickle irrigation is the entrance of insects or the exploratory hair roots of plants into the emitter outlets.

SUMMARY

The present invention is directed to a multiple emitter flow control which is summarized in the following objects:

First, to provide a drip or trickle flow emitter system which utilizes an inexpensive normally flat irrigation flow tube capable of being wrapped in a roll to minimize storage and shipping costs, and a series of low cost emitter units which are readily installed in the flow tube and capable of withstanding the forces incidental to wrapping the flow tube in a roll as well as remaining in place as the flow tube is layed in place for irrigation use.

Second, to provide an emitter flow control tube having a series of outlets fitted with a series of flush-drip emitters capable of extending radially therein for flush flow; the tube, however, being biased to assume between irrigation cycles a flattened profile whereby its wall opposite the outlets applies a force causing the emitters to bend and in bending close the emitters sufficiently to exclude insects.

Third, to provide an emitter flow control tube, as indicated in the preceding object, wherein the tube expands in response to internal water pressure, toward an essentially cylindrical profile to clear the radially inner ends of the emitters and permit expansion thereof to undergo a flush flow phase, followed by collapse to drip flow as the water pressure exceeds a predetermined value.

Fourth, to provide an emitter flow control tube as indicated in the preceding object, wherein, on termination of an irrigation cycle, the emitters pass through a flush flow phase as the pressure is reduced, then are bent by the walls of the tube to close the emitters to exclude insects.

Fifth, to provide an emitter flow control tube as indicated in the other objects, wherein movement of the tube between its flattened profile and cylindrical profile, as well as the attendent movement of the emitters prevent the entrance of exploratory hair roots of plants.

Sixth, to provide an emitter system, an embodiment which utilizes a web on which is installed a series of emitter units; the web then being folded and sealed to form a tube with the emitter units disposed therein.

DESCRIPTION OF THE FIGURES

FIGS. 1 through 8 illustrate one embodiment of the multiple emitter flow control in which:

FIG. 1 is a fragmentary edge view of the multiple emitter flow control shown at approximately full size as it appears between irrigation cycles.

FIG. 2 is an enlarged transverse sectional view thereof taken through 2—2 of FIG. 1.

FIG. 3 is an end view of an emitter in its flush flow condition.

FIG. 4 is a sectional view thereof taken through 4—4 of FIG. 3.

FIG. 5 is an enlarged fragmentary longitudinal sectional view of the flow control tube taken through 5—5 of FIG. 2 showing a side view partially in section of an emitter in its fully bent condition.

FIG. 6 is an enlarged fragmentary longitudinal sectional view corresponding to FIG. 5, but showing side views, partially in section, of two emitters, one in a slightly bent condition, the other released and assuming a flush flow condition.

FIG. 7 is an enlarged fragmentary longitudinal sectional view corresponding to FIGS. 5 and 6 showing the tube in its fully expanded condition and an emitter in its drip flow condition due to pressure of surrounding water.

FIG. 8 is a transverse sectional view taken through 8—8 of FIG. 7.

FIGS. 9 and 10 illustrate another embodiment of the multiple emitter flow control in which:

FIG. 9 is an enlarged transverse sectional view corresponding to FIG. 2 showing a modified form of the flow control tube.

FIG. 10 is a fragmentary longitudinal sectional view taken through 10—10 of FIG. 9 showing an emitter in section and in its flush flow condition.

FIGS. 11 through 18 illustrate another embodiment of the multiple emitter flow control in which:

FIG. 11 is a fragmentary edge view of the emitter flow control tube shown at approximately full size, with an emitter indicated in position.

FIG. 12 is an enlarged fragmentary longitudinal view of the emitter flow control tube with an emitter therein shown in side elevation.

FIG. 13 is an enlarged transverse sectional view of the emitter flow control tube taken through 13—13 of FIG. 12 with an emitter therein shown in end elevation.

FIG. 14 is an enlarged transverse sectional view, corresponding to FIG. 13, showing the emitter flow control tube in its expanded water pressurized condition and the emitter in its drip flow condition.

FIG. 15 is a further enlarged inner end view of the emitter in its flush flow condition.

FIG. 16 is an inner end view of the emitter corresponding to FIG. 15, showing the emitter in its drip flow condition.

FIG. 17 is a further enlarged sectional view of the emitter shown in its flush condition and taken through 17—17 of FIG. 15.

FIG. 18 is a further enlarged sectional view of the emitter in its drip flow condition taken through 18—18 of FIG. 16.

DETAILED DESCRIPTION

Referring to FIGS. 1 through 8, the multiple emitter flow control herein shown preferably utilizes a series of emitter units 1 of the flush-drip type such as shown in copending application Ser. No. 708,062, with the exception that the base is modified to be fitted in a flow control tube. More specifically, the emitter unit 1 includes an outside or base flange 2, joined to a short neck 3, which in turn, is joined to an inside flange 4, the flanges and neck being circular in cross section.

The second flange 4 is joined to an emitter tube 5 having confronting arched walls 6 joined at their lateral edges by thin webs 7. The arched walls form therebetween, when free of stress, a flush flow passage 8 joined to an outlet passage 9 extending through flange 4, neck 3 and flange 2. Formed in one of the arched walls 6 is a channel 10 which, when closed by the other wall, forms a drip flow passage, the size of which depends on irrigation requirements which may range from a fraction of a gallon per hour to two or three gallons per hour. For a one gallon per hour flow the drip passage is approximately 0.020 inches by 0.015 inches (0.0508 cm by 0.0381 cm).

The emitter unit 1 is formed of highly flexible and resilient elastomeric material even though held under moderate stress for long periods. Materials having such properties are well known. Furthermore, the walls 6 and the webs 7 are as thin as possible to minimize the force required to bend or flatten the emitter tube for drip flow therethrough.

The flow tube, designated 11, is an extrusion of plastic material selected from the materials now available for irrigation purposes.

The flow tube normally, that is when not internally pressurized, has a flat profile with lateral margins 12 having an acute radius, which are connected by essentially flat or slightly arched side walls 13 and 14. One of the side walls, such as the side wall 14 is provided with a series of perforations 15 spaced in accordance with the type of crop to be irrigated. In this regard, the perforations may be as close as six inches or as far as three feet or more.

The emitter units 1 are secured in the flow tube 11 by forcing the emitter tubes 5 and inside flange 4 through corresponding perforations 15 until stopped by the larger outside flange 2. It is preferred to orient the emitter tubes perpendicular to the longitudinal axis of the flow tube 11 as shown in FIGS. 1, 2, 5, 6 and 7; however, tests have indicated that the emitter tubes may be oriented in the longitudinal plane of the flow tube, or in an intermediate position.

Referring principally to FIGS. 5, 6 and 7, when the flow tube is free of internal pressure, such as between irrigation cycles, the flow tube is relatively flat as shown in FIG. 5 and the length of the emitter tube is greater than the distance between the flow tube walls 13 and 14. Consequently, the emitter tube may be bent as much as 90° as indicated by 16. Under this condition, at least at the base end, the emitter tube is flattened causing mutual engagement of the walls 13 and 14 and closing off the flush flow passage, leaving only the drip passage or channel 10 open. Also under this condition, drip flow permits slow escape of residual water; however, the size of the drip passage, which is, as indicated previously, in the order of only a few thousandths of an inch, excludes insects except microorganisms which pose far less a problem.

It should be noted that the flow tube is formed of plastic material selected to have substantially greater strength than the emitter tube; that is, the bending resistance of the emitter tube 1 is substantially less than the force exerted by the flow tube 11 as it assumes its normal flat condition.

When irrigation is initiated, the water pressure increases from zero pressure and causes the flow tube to expand permitting the emitter tubes 1 to straighten as indicated by 17a and 17b in FIG. 6. The amount of tube expansion which occurs before the wall 13 clears the emitter tube depends upon the length of the emitter tube and the diameter of the flow tube. It is preferred to proportion the flow tube and emitter tubes so that, under irrigation pressure, the emitter tubes extend slightly more than half the diameter of the flow tube as indicated by 18 in FIG. 7.

As the flow tube expands slightly beyond the position indicated by 17a in FIG. 6, the emitter tube is freed. The strength and size of the flow tube as well as the length of the emitter tube are calculated so that when the emitter tube is first free of the flow tube wall, the water pressure is below that required to collapse the emitter tube; hence, the emitter tube assumes a flush flow condition, as indicated by 17b in FIG. 6, which terminates when the water pressure exceeds the strength of the arched walls and causes closure to drip flow as indicated by 18 in FIG. 7. It should be noted that flush flow may be adequate, even though the duration of flush flow is extremely short, for the area at the entrance of the emitter tube which may require flushing is relatively small. Control of the amount of flush flow may be accomplished by the rate at which the irrigation water is supplied.

When the irrigation cycle is terminated, the rate at which the flow tube collapses is relatively slow resulting in a greater duration of flush flow period. This is desirable, as accumulation of matter requiring flushing occurs during the irrigation cycle, and usually the flushing action occuring at the end of the irrigation cycle is adequate. Thus during initiation of the irrigation cycle, flush flow is supplementary.

Referring to FIGS. 9 and 10, a flow tube 19 is illustrated which is formed from a flat web, the web being rolled into a tubular form and joined by bonded margins 20, for example, in the manner disclosed in U.S. Pat. No. 2,491,048. First, however, perforations 21 are formed and emitter units 22 are secured in place. The normal profile of the tube 19 is similar to the flow tube 11 and when subjected to internal pressure, expands as illustrated in FIGS. 5, 6 and 7.

The emitter units 22 are similar to the emitter units 1 except an inside flange 23 is provided which is of sufficient area as to be peripherally bonded, as indicated by 24 to a surface surrounding a perforation 21, which becomes an inner surface of the tube 19. Like the emitter units 1, each emitter unit 22 is provided with a neck 25, fitting a perforation 21, and an outside flange 26, which however, may be smaller than the flange 23. The remaining portions of the emitter unit 22 may be the same as the corresponding portions of the emitter unit and are similarly identified.

Operation of the embodiment shown in FIGS. 9 and 10 is essentially the same as the first described embodiment.

Referring to FIGS. 11 through 18, the emitter unit 27 therein illustrated includes an outside or base flange 28 joined to a short neck 29, which in turn, is joined to an inside flange 30, the flanges and neck being of circular cross section. The flange 30 is joined to a short emitter tube 31 having confronting arched walls 32 joined at their lateral edges by thin webs 33. When free of stress, the arched walls form therebetween a flush flow passage 34 terminating at its inner end in a pair of converging walls 35 merging into an outlet passage 36.

Formed in one of the arched walls 32 is a drip flow channel 37. The channel is offset so as to terminate at one of the converging walls 35 rather than communicating directly with the outlet passage 36. As indicated in FIG. 18, the drip flow channel 37 communicates under drip flow with the outlet passage 36 through a connecting passage 38 formed by the walls 32 and corresponding wall 35. As the connecting passage is larger than the drip flow channel, it does not interfer with drip flow. The emitter unit 27 is fitted in a flow tube 11 in the manner of the emitter 1.

In conducting tests with an emitter corresponding to emitter unit 1, the length of the emitter tube 5 was progressively reduced in length. Surprisingly, shortening the tube 5 appeared to have no appreciable effect on the pressure at which drip flow occurred or in the constriction of the drip flow passage with increased pressure; that is, essentially constant flow over a wide range of flow continued to occur. Tests with the emitter corresponding to emitter unit 1 indicated that installation could be improved if the width were reduced to the diameter of the neck 3 and the opening 15 which tests had indicated could be approximately the same as the neck 3. Also, with the drip flow channel 10 in alignment with discharge passage 9 the water tended to issue as a jet which placed the water as much as two or three feet from the tube 11, instead of in the immediate vicinity of the tube 11 as accomplished by trickle or drip discharge. The jet discharge did not, however, appeciably change the rate of flow.

Consequently, a test mold was made to produce an emitter unit 27, as shown in FIGS. 11 through 18. The drip flow channel was reduced in size calculated to reduce flow to approximately ½gal. per hour (1.89 letters) Tests were made of the emitter unit 27 with a tube length X of ⅛in. (3.17 mm) and a tube length Y of 1/16 in. (1.59 mm) as indicated in FIG. 17. The tests indicated that the actual drip flow rate was close to the intended drip flow rate of ½gal. per hour and was nearly constant throughout a pressure range between 5 and 40 lbs/sq. in. (2.27 kilograms and 1.81 kilograms/sq.). The flow rate of the Y length emitter tube was sligntly lower than the X length emitter tube between 5 and 20 lbs/sq. in. Whereas the two flow rates tended to become equal in the range between 20 and 40 lbs/sq. in. (0.905 kilograms and 1.81 kilograms).

In the course of tests with emitter tubes of such short length, it was observed that under mechanical force applied to a short length of open ended flow tube containing an emitter unit to cause the tube transition from a flat shape toward a circular shape, the inner flange 30 of the emitter unit tended to curve into conformity with the flow tube wall. This tendency to conform also was observed when a clear flow tube was used and subjected to water pressure as indicated by arrows 39 in FIG. 18. The tendency of the inner flange 30 to conform to the curvature of the flow tube wall produced an unexpected result; namely, when the emitter tube was positioned with its major width parallel to the axis of the flow tube, as shown in FIGS. 11 through 18, the conforming movement of the inner flange 30, exerted a force, separate from the force of water pressure, on the emitter tube in the direction of the arrows 40 in FIG. 18 tending to close the emitter tube toward drip flow. Thus it seems that the closing force on the emitter tube is greater than would be accounted for by water pressure on the emitter tube itself.

When the short emitter tube 31 is placed as shown in FIGS. 1 through 10, conformity of the inner flange with the flow tube causes the walls 32 to increase their arch, spreading the walls 32 in opposition to water pressure. If the emitter tube area is substantial, as in FIGS. 1 through 10, the force exerted by the inner flange 30 is not significant; however, when the emitter tube is shortened as in FIGS. 11 through 18, the force exerted by the inner flange is significnat as it increases the flush flow cutoff pressure if major width of the emitter tube is transverse to the flow tube axis and decreases the flush flow cutoff pressure if the major width of the emitter tube is parallel to the flow tube axis. In order to place the emitter tube in the desired orientation, the outer flange is provided with a channel 41 or other external marking.

It will be noted that the orientation of the emitter tube 31 is the same as the emitter tube 5 as shown in FIGS. 9 and 10 and that the inner flange 24 and base end of the emitter unit 22 exerts a force similar to the inner flange 30.

It will also be noted that the neck 29 is of greater length than the wall thickness of the flow tube 11, and that an interference fit is preferred to a fit which would constrict the outlet passage 36. The extra length of the neck 29 aids in thrusting the inner flange 24 through the opening 15. Once inserted, water pressure causes the inside to conform to and seal the opening 15.

It will be further noted that the embodiments shown in FIGS. 1 through 10 are preferred where the insect problem is substantial; however, if the tube 11 has a sufficiently flat profile and a capability to maintain such profile between irrigation cycles, the emitter tubes 31 are closed as shown in FIGS. 11, 12 and 13. Furthermore, even though the emitter tubes 31 are short, the emitter units 27 may be formed of elastomeric material which is sufficiently flexible as to fold under a small force exerted by the tube 11.

Having fully described our invention it is to be understood that we are not to be limited to the details herein set forth, but that our invention is of the full scope of the appended claims.

We claim:
1. A drip irrigation means, comprising:
 a. an elongated flow tube normally having between irrigation cycles, a collapsed essentially flat profile forming closely spaced relatively flat opposing wall portions, one of which is provided with a series of outlets; the flow tube being readily expansible toward an essentially cylindrical profile on initiation of an irrigation cycle;
 b. and a series of emitters, each defining a flush flow passage and a drip flow passage therein connected to a corresponding outlet;
 c. the flow passages extending transversely within the flow tube and, at least the flush flow passage, being subject between irrigation cycles to at least partial closure by the wall portion opposite from the outlets to minimize intrusion of insects and dirt;
 d. the flush flow passages being open on initiation and conclusion of an irrigation cycle to effect monentary flush flow, and closed during the irrigation cycle in response to water pressure within the flow tube thereby limiting flow to the drip flow passages.

2. A drip irrigation means, as defined in claim 1, wherein:
   a. each emitter is transversely folded to effect closure of its flush flow passage between irrigation cycles.

3. A drip irrigation means, as defined in claim 1, wherein:
   a. each emitter includes a flanged base end having a discharge passage and secured in a corresponding flow tube outlet, the flush flow passage is formed by relatively arched confronting walls defining a major transverse axis and a minor transverse axis, at least one of the walls having said drip flow passage.

4. A drip irrigation means, as defined in claim 3, wherein:
   a. said drip flow passage is offset from the discharge passage, and a lateral passage at the base end of the flush flow passage connects the drip flow passage and discharge passage when the emitter is collapsed to drip flow to reduce flow velocity.

5. A drip irrigation means, as defined in claim 1, wherein:
   a. the flow tube is a tubular extrusion;
   b. each emitter includes a base end having an inner and an outer flange, forming a channel therebetween approximating the diameter of the corresponding flow tube outlet, the inner flange being yieldable and dimensioned to be forced through the flow tube outlet and forming, with the margins of the outlet, when subject to water pressure in the flow tube, an annular seal.

6. The drip irrigation means, as defined in claim 1, wherein:
   a. the flow tube is initially a web rolled into tubular configuration with its margins bonded in circumferentially overlapping relation.

7. A drip irrigation means, as defined in claim 6, wherein:
   a. each emitter includes an inside flange bonded to the interior of the flow tube around a corresponding outlet.

8. A flush-drip irrigation system, comprising:
   a. an elongated flow line normally having between irrigation cycles, a flat condition forming closely confronting first and second walls, the first wall having a series of outlets; the flow line being expansible toward a circular condition during irrigation cycles;
   b. and a series of emitter units, each emitter unit including a perforated base portion secured in registry with a corresponding outlet; tubular means defining an emitter flush passage extending transversely into the flow line from the perforated base portion; the emitter flush passage including relatively arched walls collapsible into mutual contact in response to a predetermined low pressure in the flow line; at least one of the walls having a groove forming with the opposite wall, when in mutual contact therewith, a drip passage communicating with the perforated base portion;
   c. each emitter unit cooperating with said second flow line wall, when the flow line is in its flat condition, to restrict entrance of animate or inanimate matter into the flow line.

9. A flush-drip irrigation system, as defined in claim 8, wherein:
   a. the length of the tubular means is greater than the spacing between the first and second walls of the flow line under its flat condition and said walls exert a force causing the tubular means of each emitter unit to fold closing off the flush flow passage.

10. A flush-drip irrigation system, as defined in claim 8, wherein:
    a. the length of the tubular means approximates the spacing between the first and second walls of the flow line under its flat condition, whereby said second wall overlies and at least partially closes the extremity of the flush flow passage.

11. A flush-drip irrigation system as defined in claim 8, wherein:
    a. the drip flow passage of the emitter unit is lterally offset from the perforation in its base portion, and the end of the flush passage forms with the base portion a lateral transition passage between the drip passage and said perforation to reduce the velocity of drip flow.

12. A flush-drip irrigation system, as defined in claim 8, wherein:
    a. the flush flow passage of each emitter unit has a major transverse axis and a minor transverse axis and is adapted to be placed in the flow line with its major transverse axis coinsiding with the longitudinal axis of the flow line, whereby the base portion of each emitter unit is responsive to ater pressure exerted radially on the base portion as the flow line changes from its flat condition to its circular condition thereby to exert a force closing the flush flow passage at the adjacent end of the tubular means, such force supplementing the collapsing force exerted on the remaining portion of the tubular means.

13. A flush-drip irrigation system, as defined in claim 8, wherein:
    a. each emitter unit is formed of elastomeric material and its base portion includes an inner flange and an outer flange separated by a channel approximating the corresponding flow line outlet, the inner flange adapted to be forced through the outlet and form a seal with the margins of the outlet.

14. A flush-drip irrigation system, as defined in claim 8, wherein:
    a. the flow line is initially a web rolled into a tubular configuration with its margins bonded in circumferentially overlapping relation;
    b. each emitter unit bonded to the surface of the web forming the inner surface of the flow line.

15. An emitter adapted to be connected with an irrigation line, the emitter comprising:
    a. a base portion having an outlet bore:
    b. a yieldable inlet portion joined integrally to the base portion;
    c. the inlet portion including confronting arched walls extending radially beyond the outlet bore to define therewith diametrically opposed shoulders;
    d. the confronting walls, when arched, forming a flush flow passage terminating at the shoulders and discharging into the outlet bore;
    e. at least one of the confronting walls having a drip flow channel directed to a corresponding shoulder;
    f. the confronting walls being collapsible into mutual contact in response to a predetermined minimum water pressure confining flow to the drip channel;
    g. said corresponding shoulder and adjacent portions of the confronting wall forming a connecting radial passage between the drip flow channel and outlet bore.

* * * * *